US006880885B2

(12) United States Patent
Lan

(10) Patent No.: US 6,880,885 B2
(45) Date of Patent: Apr. 19, 2005

(54) SEAT WITH CONTOURED-FRONT FOR LOCALIZED BODY HEAT DISPERSION AND PRESSURE REDUCTION

(76) Inventor: Jianqing Lan, 12129 Red Admiral Way, Germantown, MD (US) 20876

(*) Notice: Subject to any disclaimer, the term of this patent is extended or adjusted under 35 U.S.C. 154(b) by 0 days.

(21) Appl. No.: 10/225,931

(22) Filed: Aug. 22, 2002

(65) Prior Publication Data

US 2004/0036341 A1 Feb. 26, 2004

(51) Int. Cl.7 .............................. B62J 1/00; A47C 7/02

(52) U.S. Cl. .............. 297/202; 297/452.23; 297/452.24

(58) Field of Search ............................ 297/202, 452.23, 297/452.24, 452.26

(56) References Cited

U.S. PATENT DOCUMENTS

| | | | | | |
|---|---|---|---|---|---|
| 859,828 | A | * | 7/1907 | McCloud | 297/452.46 |
| 1,238,767 | A | * | 9/1917 | Herman | 297/236 |
| 1,538,542 | A | * | 5/1925 | Blake | 297/202 |
| 2,803,289 | A | * | 8/1957 | Phelps | 297/234 |
| 2,855,986 | A | | 10/1958 | Engelen, Sr. | |
| 4,132,228 | A | | 1/1979 | Green | 601/57 |
| 4,824,174 | A | | 4/1989 | Dunn, Sr. | 297/452.46 |
| 4,946,220 | A | | 8/1990 | Wyon et al. | 297/180.13 |
| 5,382,075 | A | | 1/1995 | Shih | 297/180.14 |
| 5,568,664 | A | | 10/1996 | Lin | 5/652 |
| 5,597,200 | A | | 1/1997 | Gregory et al. | 297/180.13 |
| 5,857,749 | A | | 1/1999 | DeBellis et al. | 297/452.41 |
| 5,873,626 | A | * | 2/1999 | Katz | 297/202 |
| 6,125,486 | A | | 10/2000 | Rabon | 5/654 |
| 6,193,309 | B1 | * | 2/2001 | Gootter et al. | 297/202 |
| 6,224,151 | B1 | * | 5/2001 | McMullen, Jr. | 297/202 |
| 6,224,623 | B1 | | 5/2001 | Augustine et al. | 607/104 |
| 6,250,719 | B1 | | 6/2001 | Gebhardt | 297/452.48 |
| 6,450,572 | B1 | * | 9/2002 | Kuipers | 297/195.1 |
| 2002/0195847 | A1 | * | 12/2002 | Hsu | 297/232 |

* cited by examiner

*Primary Examiner*—Peter M. Cuomo
*Assistant Examiner*—Sarah C. Burnham

(57) ABSTRACT

A seat (chair, stool, etc.) has a seat base with a contoured front that is recessed in the middle. The recess extends towards a seating center and/or in a downward direction, creating an open area for seated person. The open area is located under the body part around the testes of a seated male person so that the dispersion of body heat from that area via air circulation will not be blocked by the seat base, and at the same time, the pressure between the testes area and the seat base will be reduced or eliminated, thereby improving the physiological condition for sperm, and in turn, may increase sperm activity and may reduce the possibility of infertility.

2 Claims, 3 Drawing Sheets

SEAT WITH CONTOURED-FRONT FOR LOCALIZED BODY HEAT DISPERSION AND PRESSURE REDUCTION

FEDERALLY SPONSORED RESEARCH

Not Applicable

SEQUENCE LISTING OR PROGRAM

Not Applicable

BACKGROUND

1. Field of Invention

This invention relates to a seating device that helps localized body heat dispersion and pressure reduction, specifically from under testes area of a seated male person.

2. Description of Prior Art

Infertility affects about one of every five couples in the United States (THE MERCK MANUAL-Home Edition, Sec. 22, Ch. 240, 2001). One of the major causes of infertility is sperm problem, which counts for 30 to 40 percent of all infertility cases. It is known that increased testicular temperature causes sperm cell abnormality or death, and will result in lowered fertility if prolonged.

Men who regularly sit for long periods of time during daytime (such as office workers, college students, etc.) may have higher temperature around testes due to the fact that seating material blocks body heat dispersion from that area. Pressure between body part and seat base also affects blood or other body system circulation around that area, which may also have an adverse effect on sperm normality.

The problem of infertility related to eating was not recognized in prior art. The closest known prior art was for general seat cooling or heat dispersion or even pressure distribution. Some have apertures (small holes) in the bottom or back of a seating device. Some others have air duct/channel(s) under the whole seating part, some combine with power fan, air permeable material, or the similar. None of these prior-art approaches intended specifically to disperse body heat or reduce pressure from around testes area of a seated male person. Even for general cooling it is not effective (such as small holes) and is impractical and costly (such as air duck, power system). For example, U.S. Pat. No. 5,597,200 to Gregory, et al. (1997) discloses a device for a vehicle seat which can cool the whole seat. However it is neither for localized cooling nor for pressure reduction at a front middle of seat base. Furthermore it needs an air duct, permeable seating material and conditioned air from a central source in the vehicle, which is not practical for office chairs. U.S. Pat. No. 5,382,075 to Shih (1995) shows a ventilation device for a chair seat, which has a motor, fan, vent port, and a plurality of air guide plates. It is designed for general seat ventilation, but is neither for localized air circulation nor for pressure reduction at the front middle of seat base. It is also complicated and costly compared to conventional chairs. As another example, U.S. Pat. No. 4,132,228 to Green (1979) reveals a seat cushion assembly with some layers specially designed for even pressure distribution. But it is not for pressure elimination especially under the testes area of a seated male person. Furthermore a better fit of the seat cushion assembly (which has a layer of resilient foam material without hole) into the gluteal region of a seated person might well cause the temperature around the testes area to increase because of the lack of direct airflow.

BRIEF SUMMARY OF THE INVENTION

This seat design is also very easy to be reduced to practice, and has no complicated machinery comparing to other cooling seat devices. It uses almost no or little additional material and has almost no or little additional cost comparing to conventional seating devices. It is also very easy to use, nothing special to turn on or no complicated system to operate.

This seat design is also very easy to be reduced to practice, has no complicated machinery comparing to other cooling seat devices. It uses almost no or little additional material and has almost no or little additional cost comparing to conventional seating devices. It is also very easy to use, nothing special to turn on or no complicated system to operate.

BRIEF DESCRIPTION OF THE SEVERAL VIEWS OF THE DRAWING

Drawing Figures

DETAILED DESCRIPTION OF THE INVENTION

Figure 1A:
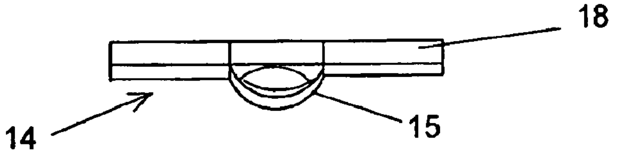
FIG. 1A is a front view of the chair in FIG. 1, without showing chair back and legs.
Figure 1B:
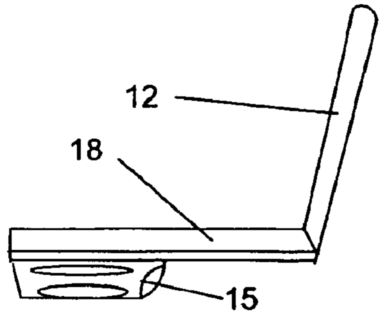
FIG. 1B is a side view of the chair in FIG. 1, without showing chair legs.
Figure 1:
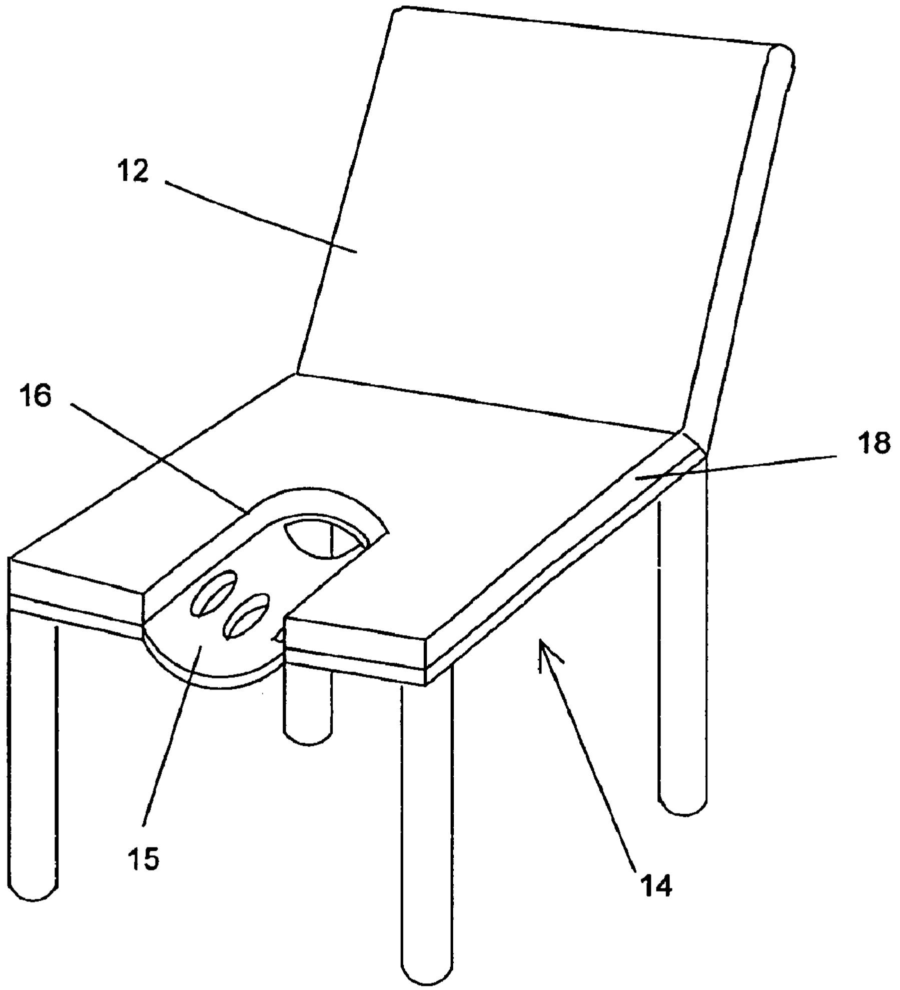
FIG. 1 is a perspective view of a chair with contoured front at seat base.

FIG. 1 is a perspective view of a basic version of my new design. A seat (chair, stool, etc.) has a contoured front of seat base 14 so that the mentioned front recessed in the middle towards seating center and downward, creating an open area 16 for a seated person, which is under the body part around the testes of a seated male person.

The recessed part 15 can be formed when molding the whole chair if it is made of thermoplastic or such, or the recessed part 15 can be made separately (without padding 18) and attached (using glue, screws, nails, etc.) to seat base 14 which has a cut-open area at the front middle.

Seat back 12 and padding 18 are optional. So are arms or other accessories (not shown).

Figure 2A:
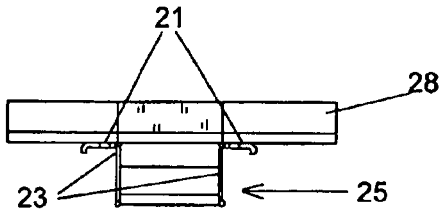
FIG. 2A is a front view of the chair in FIG. 2, without showing chair back and legs. Part 25 is at down position.
Figure 2B:
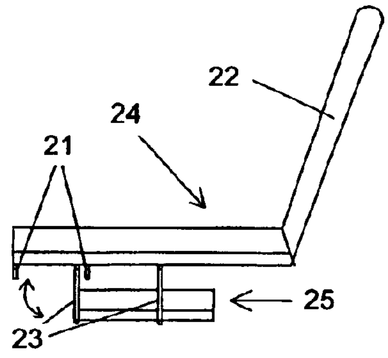
FIG. 2B is a site view of the chair in FIG. 2, showing chair legs. Part 25 is at down position.
Figure 2:
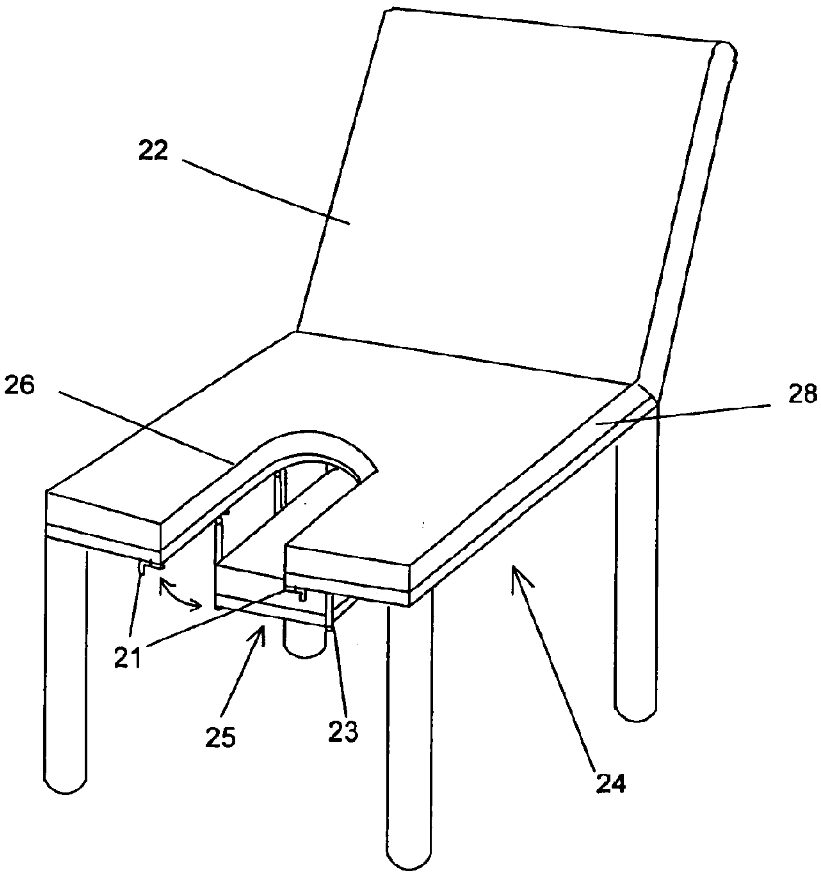
FIG. 2 is a perspective view of an alternate embodiment of a chair with a contoured front at seat base resulted from folding down corresponding part at seat base.

FIG. 2 illustrates another embodiment of the invention. The general structure of this seat offers a similar opening in the front middle of seat base as described above. The variation is that the recessed part 25 is mobile. The recessed part 25 is made in the same way (soft padding 28 on top of rigid seat base) as other part of the seat base 24. Part 25 is connected to part 24 using lever hinges 23 or the similar. Part 5 has a shape that fits the cut-open area 26 in the front middle of seat base 24, 50 that when part 25 aligns with the rest of seat base 24 and is locked by latches 21 the seat is similar to a conventional chair if localized body heat dispersion and/or pressure relief is not desired. Latches 21 can be released and part 25 can be pressed down to create the opening.

In FIG. 2 and FIG. 2B the curved double-arrow sign indicates the movement direction of the folding.

Seat back 22 and padding 28 are optional. So are arms or other accessories (not shown).

Figure 3A:
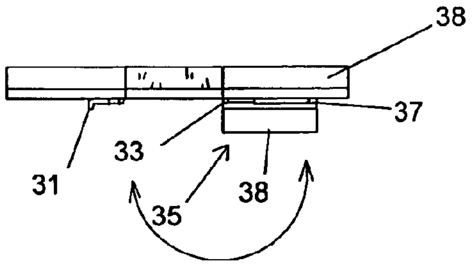
FIG. 3A is a front view of the chair in FIG. 3, without showing chair back and legs. Part 35 is flipped over and is held by catch 37.
Figure 3B:
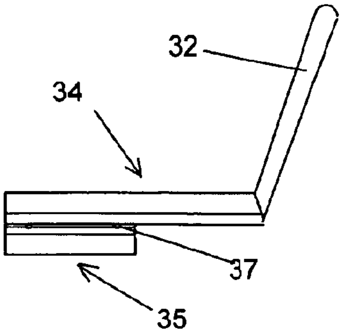
FIG. 3B is a site view of the chair in FIG. 3, without showing chair legs. Part 35 is at flipped over position.
Figure 3:
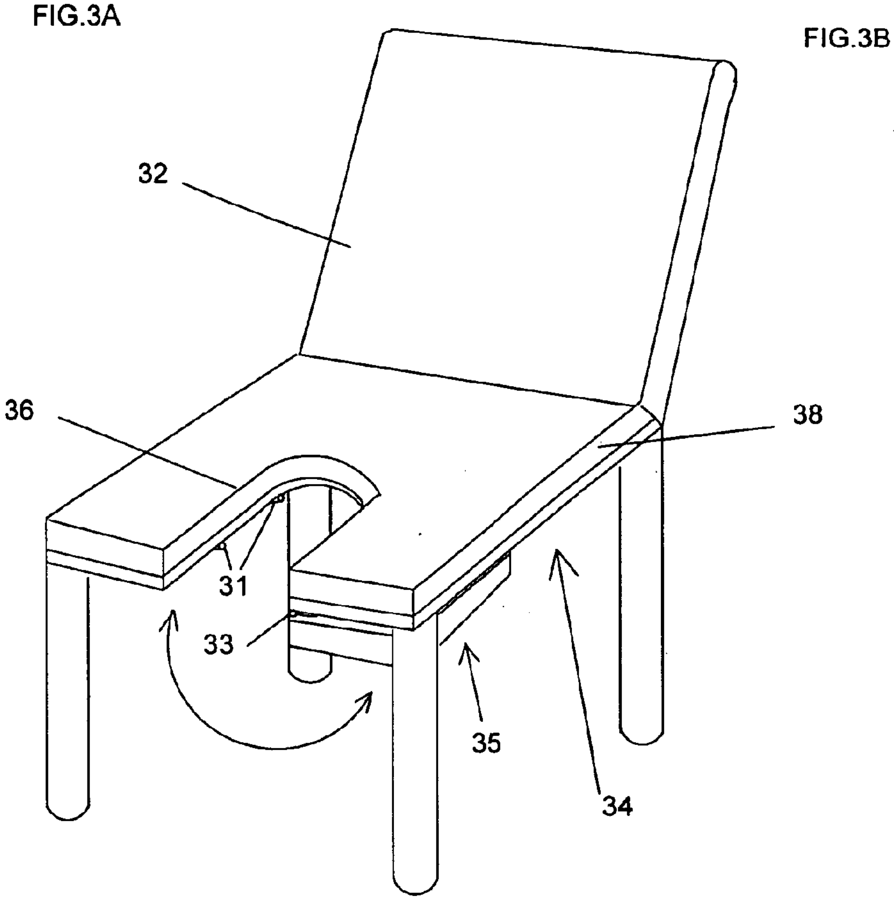
FIG. 3 is a perspective view of another embodiment of a chair with a contoured front at seat base resulted from flipping over corresponding part at seat base.

A third embodiment of the invention is shown in FIG. 3. Similar to FIG. 1 and FIG. 2, it is a chair with opening in the front middle of seat base 34. What is different in this embodiment is that it has a flip-over recessed part 35 that fits the shape of open area 36 and connects to the rest of seat base 34 by hinges 33. Part 35 can be locked in non-opening position by latches 31 and can be locked in opening position by catches 37.

In FIG. 3 and FIG. 3A the curved double-arrow sign indicates the movement direction of the flipping.

Seat back 32 and padding 38 are optional. So are arms or other accessories (not shown).

The invention has been described in detail with specific embodiments thereof, but it is evident that variations and modifications can be effected within the spirit and scope of the invention.

Other ramifications: Creating of above-mentioned opening in a seat base at its front middle can also be achieved through sliding, detaching, or similar means, of the corresponding part at the front middle of the seat base.

Instead of creating an open area in the seat base changing the shape of its rigid part, one can just cut out a corresponding area of the padding if it is a thick one to create a not-so-obvious open area. Additionally one can use good heat conducting material (such as aluminum) to replace original material (wood, or synthetic material) for rigid part in that seating area. Heat from body part around testes can be transferred to heat conducting material and dispersed through the other side (underneath), adding cooling fins underneath can assist this heat dispersion.

The new design disclosed in this invention can be applied to various seating devices, including those portable, with removable part(s), folding, stacking, collapsible, with interchangeable part(s), convertible, with detachable part(s), combined with other device(s), supplemental seating devices.

What I claim as my invention is:

1. A seat for localized body heat dispersion and pressure reduction under a seated male person's testes area, said seat comprising:

(a) a seat base comprising a sheet of rigid material of sufficient size to support a seated person's whole buttocks, said seat base having opposing right and left edges that connect at a rear edge;

(b) a contoured front of said seat base opposing said rear edge, said contoured front extending from said right edge to said left edge and being recessed in a middle of said contoured front of said seat base;

(c) an elongated open area in said middle of said contoured front extending for a partial length toward said rear edge, said open area being under a seated male person's testes area whereby body heat dispersion from said open area is not obstructed at downward and forward directions;

(d) said open area being substantially larger than an area corresponding to a seated male person's testes and substantially smaller than an area corresponding to a person's buttocks;

(e) a right side and a left side of said seat base flanking said open area, each of said right and left sides having a width from right to left thereof being greater than a width from right to left of said open area;

(f) said seat base having every part thereof lower than any part of a seated person's buttocks and upper thighs during usage of said seat;

(g) a recessed part having an approximate size of said open area in said seat base;

(h) said recessed part having one or a plurality of apertures with substantial size to allow air to flow through;

(i) said recessed part being under said open area and being substantially lower than said seat base and being fixed and immobile.

2. The seat of claim 1 wherein said recessed part has a curved-down shape.

* * * * *